US006869152B2

United States Patent
Weh et al.

(10) Patent No.: US 6,869,152 B2
(45) Date of Patent: Mar. 22, 2005

(54) HYDRAULIC UNIT

(75) Inventors: Andreas Weh, Durach (DE); Tomoya Ideguchi, Immenstadt (DE); Nathan McCormick, Charleston, SC (US); Douglas Patterson, Goose Creek, SC (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/763,243

(22) Filed: Jan. 26, 2004

(65) Prior Publication Data

US 2004/0160120 A1 Aug. 19, 2004

(30) Foreign Application Priority Data

Jan. 24, 2003 (DE) ......................................... 103 02 681

(51) Int. Cl.[7] ................................................. B60T 8/36
(52) U.S. Cl. ................................ 303/116.4; 303/119.3; 303/DIG. 10
(58) Field of Search .......................... 303/DIG. 10, 87, 303/119.3, 116.4

(56) References Cited

U.S. PATENT DOCUMENTS 5,449,226 A * 9/1995 Fujita et al. ............. 303/116.4
5,967,625 A * 10/1999 Reuter et al. ............ 303/116.1
6,250,724 B1 * 6/2001 Shimizu et al. .......... 303/119.2
6,398,315 B1 * 6/2002 Dinkel et al. ............ 303/113.1
6,443,537 B2 * 9/2002 Koyama .................. 303/119.3
6,550,872 B1 * 4/2003 Caldwell .................. 303/84.2

FOREIGN PATENT DOCUMENTS

JP          2000-177559     *  6/2000

* cited by examiner

*Primary Examiner*—Jack Lavinder
*Assistant Examiner*—Bradley King
(74) *Attorney, Agent, or Firm*—Ronald E. Greigg

(57) ABSTRACT

A hydraulic unit for an electronically controllable brake system of a vehicle includes a housing block with mounting faces for instance for an electric motor and an electronic control unit; a plurality of connections for hydraulically contacting the block; and installation chambers, for pump elements, valves, and damping devices. These damping devices are connected hydraulically downstream to the pump elements, in order to damp operation-caused pressure pulsations and noises. Installation chambers (18*i*–*k*) for the damping devices and the installation chambers (18*a*–*h*) of the valves extend to a common mounting face of the housing block intended for mounting the electronic control unit. The damping devices protrude past this mounting face.

11 Claims, 2 Drawing Sheets

HYDRAULIC UNIT

BACKGROUND OF THE INVENTION

1. Field of the Invention

The invention is directed to an improved hydraulic unit for an electronically controllable brake system of a vehicle.

2. Description of the Prior Art

A housing block of a hydraulic unit of the type with which this invention is concerned is already known, for instance from German Patent Disclosure DE 198 05 843 A1. This housing block has a plurality of mounting faces, to which an electric motor, for instance, for driving pump elements disposed in the housing block, or an electronic control unit for triggering magnet valves provided in the housing block, can be secured. The housing block is furthermore provided with connections for supplying it with pressure fluid and, in addition to the installation chambers for the aforementioned pump drive, the pump elements and the magnet valves, it has still further installation chambers for damping devices. These damping devices are disposed downstream of the pump elements in terms of circuitry, for damping pressure pulsations and the operating noises tripped by them.

In the known hydraulic unit, the installation chambers of the damping devices are fully integrated with the housing block and are furthermore disposed perpendicular to the installation chambers of the valves. This limits the possible volume of the damping devices and/or means that the hydraulic unit requires a relatively large installation space. Moreover, the pressure fluid conduits in the hydraulic unit that are required for hydraulically connecting the damping devices can be attained only with great effort in terms of production, and because of their length they further contribute to increasing the structural size of the hydraulic unit.

In another hydraulic unit of this generic type, disclosed in DE 199 58 194 A1, the damping devices coaxially adjoin the pump elements and are connected to the pressure buildup valves via pressure fluid conduits that extend radially or tangentially. This mode of construction has the same disadvantages described above. Especially the maximum possible volume of the damping devices is severely restricted, since the pump elements already occupy a substantial proportion of the possible length of the housing block in the direction of the longitudinal axes of the pump elements.

OBJECT AND SUMMARY OF THE INVENTION

It is accordingly the object of the present invention to improve the known hydraulic units in terms of their operating noise, their structural volume, and the effort and expense of metal-cutting, and thus to improve both their production costs and their adaptability to various types of vehicle.

Compared to the hydraulic units known from the prior art cited, a hydraulic unit according to the invention has the advantage that, with unaltered compact dimensions, it includes damping devices for damping the pressure pulsations generated by the pump elements and is especially simple to produce technically. The pressure fluid conduits for hydraulically contacting the damping devices are relatively short and as a result entail little expense for metal-cutting. The idle volume, the hydraulic rigidity, and hence the controllability of the brake system are thus improved. Moreover, the volume of the damping device can be easily adapted to a given specific application, since only a fractional volume is accommodated in the housing block of the hydraulic unit, while a second fractional volume, which is easily varied in size, extends outside the housing block. It is especially advantageous if the damping device protrudes with its second fractional volume into the interior of a mountable control unit, since as a result the emission of sound caused by the pressure pulsations is additionally damped.

Further advantages or advantageous refinements of the invention are disclosed. According to one feature the inlet is especially reliably sealed off from the outlet of the damping device, since the sealing point is formed by the outer contour of the pump elements in cooperation with the wall of the installation chamber of the pump elements. The sealing point is created simultaneously with the assembly of the pump elements and does not require any separate sealing elements. Hence the sealing point is not subjected to wear associated with the operating time, and at the same time costs for keeping required parts on hand and for assembly are reduced.

BRIEF DESCRIPTION OF THE DRAWINGS

The invention will be better understood and further objects and advantages thereof will become more apparent from the ensuing detailed description of a preferred embodiment taken in conjunction with the drawings, in which.

DESCRIPTION OF THE PREFERRED EMBODIMENT

Figure 1:
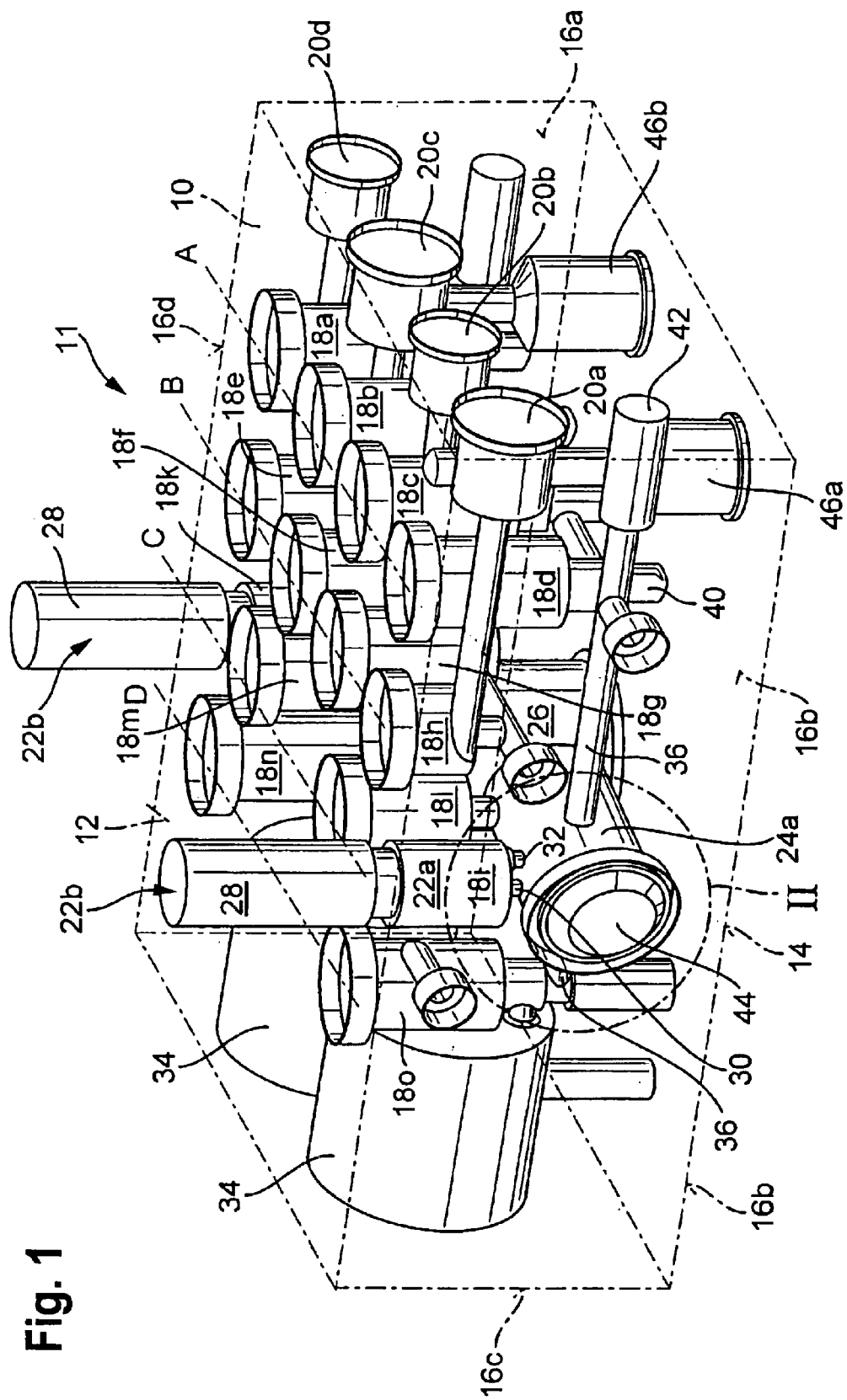
FIG. 1 shows the subject of the invention in a perspective, inverted view of a housing block of an electronic brake system.

The housing block 10 of a hydraulic unit 11, shown as an example in FIG. 1, is intended for use in an anti-lock brake system with VDC (vehicle dynamics control). It comprises a parallelepiped block of nonferrous material, for instance an aluminum alloy, preferably produced by extrusion and then machined by metal-cutting. The housing block 10 has a rectangular upper mounting face 12, opposite it a lower mounting face 14, and a total of four circumferential faces 16a–d, which are oriented perpendicular to the mounting faces 12, 14. The upper mounting face 12 is intended for anchoring an electronic control unit, not shown, while an electric motor can be flanged to the lower mounting face 14. From the upper mounting face 12, installation chambers 18 embodied in cup-shaped fashion extend into the housing block 10. The installation chambers 18 essentially serve to receive magnet valves, but the magnet valves have not been shown in FIG. 1 for the sake of simplicity. A total of fourteen installation chambers 18a–18o begin at the upper mounting face 12 and are arranged in a total of four rows A–D parallel to one another. The first row A, located at the outer right in FIG. 1, of installation chambers 18a–d is located next to four installation chambers 20a–d on the circumferential side 16a of the housing block 10 and these latter installation chambers form the connections for the brake lines that lead to the various wheel brake cylinders of a vehicle. The installation chambers 18a–d for so-called pressure buildup valves are disposed in the first row A, while pressure reduction valves are placed in the adjacent second row B with the installation chambers 18e–h. The pressure in the wheel brake cylinders can be modulated with the pressure buildup valves and pressure reduction valves. To that end, these valves are embodied as 2/2-way switching valves known per se, which can be switched over electrically by the electronic control unit from an open position to a closed position and vice versa. The triggering is done as a function of measured variables of various sensors, which belong to the brake system and detect for instance the wheel slip at one of the vehicle wheels and/or the brake pressure at one of the wheel brake cylinders and carry it on to the control unit.

Figure 3:
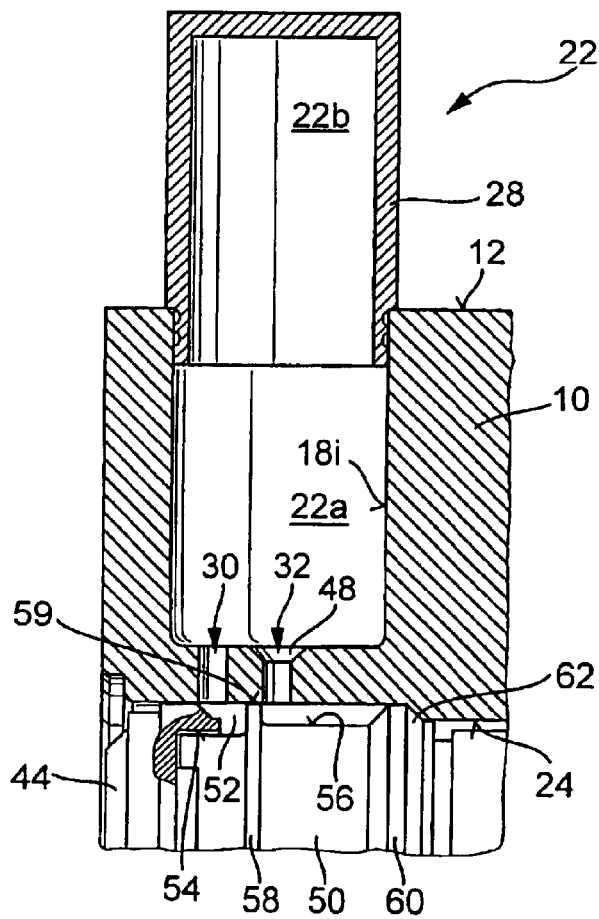
FIG. 3 is a longitudinal section through FIG. 2, with the pump element installed and with the damping device.

Damping devices 22, whose significance will be explained hereinafter, are built into the outermost installation chambers 18i, 18k of the third row C. Below this third row C, that is, beginning at the lower mounting face 14 of the housing block 10, the installation chambers 24a and b, among others, for two coaxially facing pump elements 50 (see FIG. 3) extend transversely to the installation chambers 18i–m of this third row C. Between the two last-mentioned pump elements, an installation chamber 26 is embodied, beginning at the lower mounting face 14. This installation chamber 26 serves to receive a rotatably supported eccentric element, which can be set into rotary motion by the mountable electric motor and imposes a reciprocating motion on the pump elements. Because of this reciprocating motion, the pump elements aspirate brake fluid through a pump inlet and pump the pressure fluid to a pump outlet, thereby building up pressure. The pump elements 50 are each single-cylinder piston pumps of a type of construction known per se. In principle, unwanted pressure pulsations, which are perceptible in the surroundings of the hydraulic unit 11 as operating noises, can be created in the pumped flow of pressure fluid. Damping of the operating noises is possible by smoothing the pressure pulsations, for which purpose one damping device 22 each is connected hydraulically downstream to the pump elements.

In the exemplary embodiment here, the damping devices 22 shown are oriented axially parallel to the installation chambers 18a–h of the magnet valves and extend in the direction of the upper mounting face 12 for the control unit. Each damping device 22 comprises a first part 22a, which is integrated with the housing block, and a second part 22b, which is located outside the housing block 10; the second part 22b protrudes into the interior of the control unit to be mounted. The second part 22b is defined by a cup-shaped element 28, which is inserted by its opening into the installation chamber of the first part 22a and thus closes the first part off from the control unit. To that end, the cup-shaped element 28 is preferably anchored by positive engagement to the housing block 10, for instance by plastic deformation of material comprising the housing block 10 during the process of its being pressed into a circumferential recess provided on the element 28 (a process known as a self-clinching connection). The volume of the damping device 22 can easily be varied for a specific vehicle simply by changing the dimensions of the cup-shaped element 28.

The damping device 22 shown is contacted hydraulically via an inlet 30 and an outlet 32; both connections extend from the bottom of the installation chamber 18i, 18k and each discharges in a straight line into the installation chamber 24 of the pump element.

Two so-called high-pressure switching valves can be built in between the two damping devices 22 in the third row C; together with switchover valves in the fourth row D of installation chambers 18n and o, they hydraulically connect a master cylinder, which can be connected to the housing block 10, to the wheel brake cylinders and control a communication between the inlet side of the pump elements and the master cylinder. For that purpose, both pairs of valves are embodied as triggerable 2/2-way switching valves; in their nontriggered basic position, the switchover valves establish a pressure fluid communication between the master cylinder and the pressure buildup valve, while in the switching position they disconnect it, and conversely the high-pressure switching valves in their basic position block the communication of pressure fluid from the master cylinder to the inlet side of the pump elements and enable it in the triggered state.

Opposite the connections of the wheel brake cylinders, the installation chambers 34 of low-pressure reservoirs adjoin the fourth row D of magnet valves. These installation chambers extend transversely to the rows A–D of valves and are open toward the circumferential face 16c of the housing block 10 and communicate hydraulically with the inlet of the pump elements via pressure fluid conduits. These low-pressure reservoirs serve to supply the pump elements with brake fluid.

With the exception of a single pressure fluid conduit 36, visible in FIG. 1, the courses of the other pressure fluid conduits are of no significance for the present invention, and so a more-detailed explanation of them will be dispensed with. The single pressure fluid conduit 36 mentioned originates at the circumferential face 16a of the housing block 10 that has the installation chambers 20a–d of the wheel brake cylinder connections, and it connects the installation chamber 18 of one of the pressure buildup valves, disposed in the first row A of magnet valves, with the installation chamber 18n and 18o of a switchover valve. For that purpose, one short branch conduit 40, ending in the interior of the housing block 10 and communicating with the pressure fluid conduit 36, originates at each of the applicable installation chambers 18, 18n and 18o. These branch conduits 40 are disposed such that in the installed state of the hydraulic unit 11 in the vehicle, they are each located at the highest points of the respective installation chambers 18, 18n and 18o. This makes it possible for the hydraulic unit 11 to be completely vented when it is being serviced. The pressure fluid conduit 36 itself is shown in the form of a continuous, straight blind bore 42, whose orifice is closed off in pressure fluid-tight fashion by a closure element, for instance in the form of a pressed-in ball (not shown). Moreover, the applicable blind bore 42 has a course in the housing block 10 such that it intersects or penetrates the installation chamber 24 of a pump element in the region of the outer end. In FIG. 1, this installation chamber 24 of the pump element is closed from the outside by a pressed-in lid 44, making the pump element per se not visible in FIG. 1.

For the sake of completeness, the two installation chambers 46a and 46b will also be noted; they open to the lower mounting face 14 of the housing block 10. These installation chambers 46a, b form connections for a master cylinder of a brake system, on the precondition that this master cylinder is coupled with a brake fluid reservoir and is designed with two circuits. Accordingly, one connection or installation chamber 46a or 46b is assigned to each brake circuit. The lower mounting face 14 for the electric motor of the hydraulic unit 11 is recessed relative to the face on which the installation chambers 46a and 46b for the master cylinder are embodied. As a result, the lower mounting face 14 has an offset.

Figure 2:
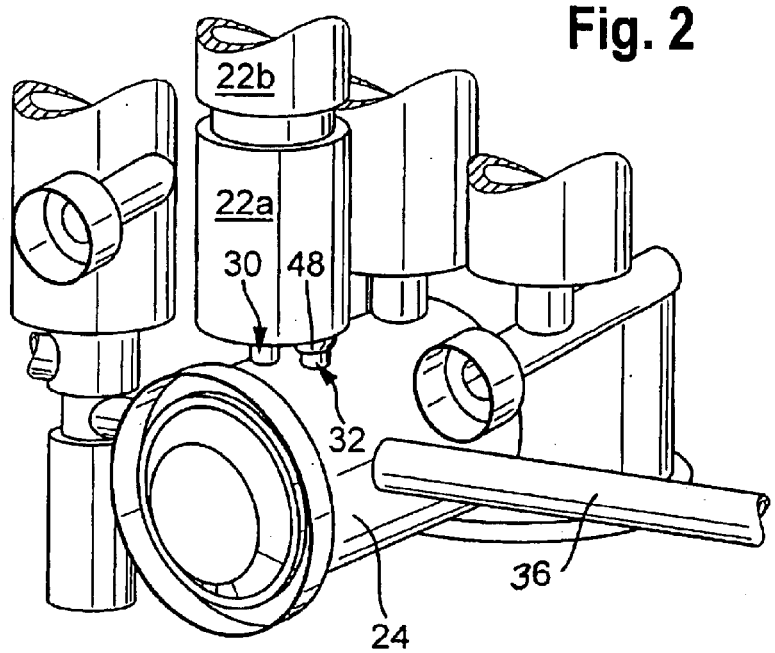
FIG. 2 is an enlarged detail II of FIG. 1.

FIG. 2, in an enlarged detail, shows the installation chamber 24, closed off from the outside, of a pump element, as well as the first part 22a of the damping device 22, which part is integrated with the housing block 10 and has an inlet 30 and an outlet 32, and portions of the pressure fluid conduit 36 that connects the installation chambers 18 of the pressure buildup valves with the installation chamber 18n and 18o of a switchover valve and intersects the installation chamber 24 of the pump element. The inlet 30 and outlet 32 of the damping device 22 discharge essentially perpendicular into the installation chamber 24 of the pump element and are axially spaced apart from one another in the direction of the longitudinal axis of this installation chamber 24. The inlet 30 is embodied as a cylindrical bore and the outlet 32 is embodied as a bore, with a conical widened portion 48 oriented toward the first part 22a of the damping device 22.

For the sake of clear illustration of the relationships explained above, FIG. 3 shows a detail of the housing block 10, in this case in longitudinal section. In this longitudinal section, the installation chamber 18 of the damping device 22 originating at the upper mounting face 12 and having the inlet 30 and outlet 32 can be seen, along with the outlines of a pump element 50, inserted into its assigned installation chamber 24, and the lid 44 that closes off the installation chamber 24 of the pump element 50 from the outside. The element 28 that defines the second part 22b of the damping device 22 is shown as well.

The pump element 50 comprises a pump cylinder, fixed in the installation chamber 24, and a piston that is guided movably in the pump cylinder. The internal structure of the pump element 50 is well known from the prior art and moreover is of no significance in comprehending the invention. It can be assumed that the outlet of the pump element 50 discharges into a hollow chamber 52, which results from a circumferential shoulder 54 on the end of the pump element 50 between the wall of the installation chamber 24, the pump cylinder, and the lid 44 that closes the installation chamber 24. This hollow chamber 52 communicates with the first part 22a of the damping device 22 via the inlet 30. The outlet 32 of the damping device 22, which is axially spaced apart from the inlet 30, has a conically widened portion 48, built into it which is a suitably shaped throttle element comprising a throttle baffle and an upstream filter (none of these visible in the drawing). Following the throttle element, the outlet 32 discharges into an annular groove 56 on the circumference of the pump element 50. The aforementioned pressure fluid conduit 36, extending between the pressure buildup valve and a switchover valve, discharges into this annular groove 56.

By means of a damping device 22 constructed in this way, hydraulically connected, and disposed on the housing block 10, system-dictated pressure pulsations of the pump elements can be reliably smoothed out with the least possible structural size and at comparatively little engineering effort and expense. The fundamental prerequisite for this, however, is that there be no hydraulic short circuit, or in other words that the flow through the damping device 22 be assured, between the region at the outlet of the pump element 50 and the region downstream of the throttle element of the damping device 22.

To avoid such a short circuit, the shoulder 54 on the end of the pump cylinder and the annular groove 56 together define an annular rib 58, which protrudes from the pump cylinder and, when the pump element 50 is installed in final form, is located between the inlet 30 and the outlet 32 of the damping device 22. Between this annular rib 58 and the wall of the installation chamber 24 there is a press-fit connection, so that the annular rib 58, with further components, serves as a wear-free sealing point 59 between the two connections. The annular groove 56 that defines the annular rib 58 on one side extends, on its side remote from the annular rib 58, as far as a circumferential collar 60 of the pump element 50. This collar 60 rests on a shoulder 62 of the installation chamber 24 and thereby defines the extent to which the pump element 50 is pressed into the housing block 10. In addition, there is a second press fit between the circumferential face of this formed-on collar 60 and the wall of the installation chamber 24, and as a result the eccentric chamber 26 (FIG. 1), coaxially adjoining the installation chamber 24 of the pump element 50, is sealed off reliably from the part of the housing block 10 that carries pressure fluid.

As already noted, the installation chamber 24 of the pump element is closed off from the outside in pressure fluid-proof fashion by a closure lid 44. This lid 44 is secured by positive engagement to the housing block 10, for instance being pressed into it, and rests with its inside on the end face of the pump element 50 and thereby additionally axially braces the pump element 50 toward the outside.

It is understood that changes or advantageous refinements may be made in the exemplary embodiment described, without departing from the fundamental concept of the invention. This fundamental concept is based on an arrangement, that is as space-saving as possible and can be produced as simply as possible technically, of a damping device 22 on the housing block 10 of a hydraulic unit 11; this arrangement is equally applicable to anti-lock brake systems and brake systems with combined anti-lock and VDC and/or traction control provisions.

The foregoing relates to a preferred exemplary embodiment of the invention, it being understood that other variants and embodiments thereof are possible within the spirit and scope of the invention, the latter being defined by the appended claims.

We claim:

1. In a hydraulic unit (11) for an electronically controllable brake system of a vehicle with a housing block (10), comprising at least one mounting face (12, 14) for an electronic control unit, installation chambers (20) for hydraulic connections for supplying the hydraulic unit (11) with pressure fluid, installation chambers (26, 24, 18i–k, 18a, 18b) for pump elements (50) and damping devices (22), disposed downstream of the pump elements (50) for damping pressure pulsations, and for electrically triggerable pressure buildup values and pressure reduction valves for modulating the brake pressure at least one wheel brake cylinder communicating with the hydraulic unit (11), the improvement wherein the installation chambers (18i, 18k) of the damping devices (22) and the installation chambers (18a–h) of the valves extend to the common mounting face (12) of the housing block (10) on which the electronic control unit can be mounted; and wherein the damping devices (22) protrude past this mounting face (12), further comprising an inlet (30) and an outlet (32) of the damping device (22) discharging into the installation chamber (24) for one of said pump elements (50); and wherein the one pump element (50), in the region between the inlet (30) and the outlet (32) of the damping device (22), forms a sealing point (59) together with the wall of the installation chamber (24) of the one pump element (50).

2. The hydraulic unit in accordance with claim 1, wherein the sealing point (59) is formed by a press-fit connection between the one pump element (50) and the wall of its installation chamber (24).

3. The hydraulic unit in accordance with claim 2, wherein the one pump element (50) has an encompassing annular rib (58), which forms the press-fit connection with the wall of the installation chamber (24).

4. The hydraulic unit in accordance with claim 3, wherein annular rib (58) is defined on one side by an annular groove (56), into which the outlet (32) of the damping device (22) discharges.

5. The hydraulic unit in accordance with claim 4, wherein the one pump element (50) comprises a pump cylinder, fixed in the installation chamber (24), and wherein the annular rib (58), on the side opposite the annular groove (56), together with a circumferential shoulder (54) on an end of the one pump element (50) between the wall of the installation chamber (24), the pump cylinder, and a lid (44) that closes the installation chamber (24), form a recess (52); wherein the outlet of the one pump element (50) discharges outward in the recess (52); and wherein the inlet (30) of the damping device (22) branches off from the recess (52).

6. The hydraulic unit in accordance with claim 4, wherein installation chambers (18n–o) for switchover valves for shifting the brake system from a normal braking mode or an anti-lock mode into a traction control mode or a vehicle dynamics control mode are provided in the housing block (10); and wherein the installation chambers (18a–d) for the pressure buildup valves, and the installation chambers (18n–o) for the switchover valves communicate with one another through a straight pressure fluid conduit (36), the pressure fluid conduit (36) intersecting the installation chamber (24) of a pump element in the region of the annular groove (56).

7. The hydraulic unit in accordance with claim 5, wherein installation chambers (18n–o) for switchover valves for shifting the brake system from a normal braking mode or an anti-lock mode into a traction control mode or a vehicle dynamics control mode are provided in the housing block (10); and wherein the installation chambers (18a–d) for the pressure buildup valves, and the installation chambers (18n–o) for the switchover valves communicate with one another through a straight pressure fluid conduit (36), the pressure fluid conduit (36) intersecting the installation chamber (24) of a pump element in the region of the annular groove (56).

8. The hydraulic unit in accordance with claim 6, wherein the pressure fluid conduit (36) begins at a circumferential side (16a) of the housing block (10) and ends in blind-bore fashion in the interior of the housing block (10).

9. The hydraulic unit in accordance with claim 7, wherein the pressure fluid conduit (36) begins at a circumferential side (16a) of the housing block (10) and ends in blind-bore fashion in the interior of the housing block (10).

10. The hydraulic unit in accordance with claim 1, further comprising cup-shaped elements (28) closing the installation chambers (18i, 18k) of the damping device (22), which cup-shaped elements are inserted by their open ends in portions into the associated installation chambers (18i, 18k) of the housing block (10); and positive engagement means anchoring the elements (28) to the housing block (10) with the closed end of the cup-shaped elements protruding into the interior of the mounted control unit.

11. The hydraulic unit in accordance with claim 1, wherein the installation chambers (18a–h) of the valves and the installation chambers (18i, 18k) of the damping device (22) extend substantially axially parallel to one another.

* * * * *